United States Patent [19]
Nevarez

[11] Patent Number: 5,499,358
[45] Date of Patent: Mar. 12, 1996

[54] METHOD FOR STORING A DATABASE IN EXTENDED ATTRIBUTES OF A FILE SYSTEM

[75] Inventor: Carlos A. Nevarez, Orem, Utah

[73] Assignee: Novell, Inc., Orem, Utah

[21] Appl. No.: 165,971

[22] Filed: Dec. 10, 1993

[51] Int. Cl.$^6$ ................................................. G06F 17/30
[52] U.S. Cl. ............................ 395/600; 364/DIG. 1; 364/282.1; 364/282.3
[58] Field of Search ............................ 395/600, 425, 395/400; 364/419.19

[56] References Cited

U.S. PATENT DOCUMENTS

| | | |
|---|---|---|
| 5,047,918 | 9/1991 | Schwartz et al. ................ 395/600 |
| 5,113,519 | 5/1992 | Johnson et al. ................. 395/600 |
| 5,218,696 | 6/1993 | Baird et al. ..................... 395/600 |
| 5,371,885 | 12/1994 | Letwin ........................... 395/600 |
| 5,376,671 | 11/1994 | Feigenbaum et al. ............. 395/600 |
| 5,412,808 | 5/1995 | Bauer ............................ 395/600 |

Primary Examiner—Paul V. Kulik
Attorney, Agent, or Firm—Snell & Wilmer; Michael K. Kelly

[57] ABSTRACT

The present invention provides a definition, format, and structure of extended attributes for managing, maintaining, and controlling file systems. This is accomplished by creating a database containing management, maintenance, control, and other user-defined data that are associated with a directory entry of the file system. The database is stored inside the extended attribute or sets of extended attributes. According to the present invention, each extended attribute includes a header for defining the extended attribute that comprises a first plurality of fields. It also includes a plurality of records for storing data. In turn, each record of the plurality of records comprises a second plurality of fields. The extended attribute is identified by a string stored in a directory entry of a directory entry table for the file system. The string comprises a predetermined substring denoting the extended attribute having the database architecture of the present invention. The first plurality of fields of the extended attribute includes fields for storing a length of the header, a version number of the header, a revision number of the header, the number of extended attributes in the database, and the number of records in the plurality of records in the database. The second plurality of fields includes fields for storing a name of a record, data, a record length, a length of the record name, and a length of the data. Both the name and data are stored as strings.

14 Claims, 3 Drawing Sheets

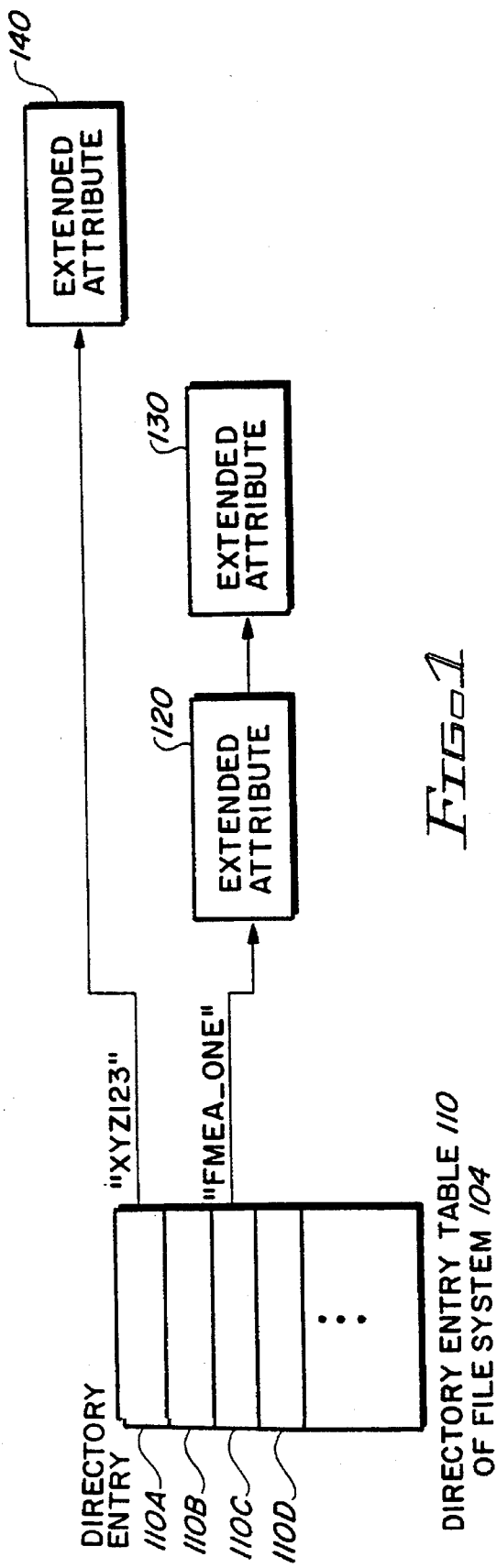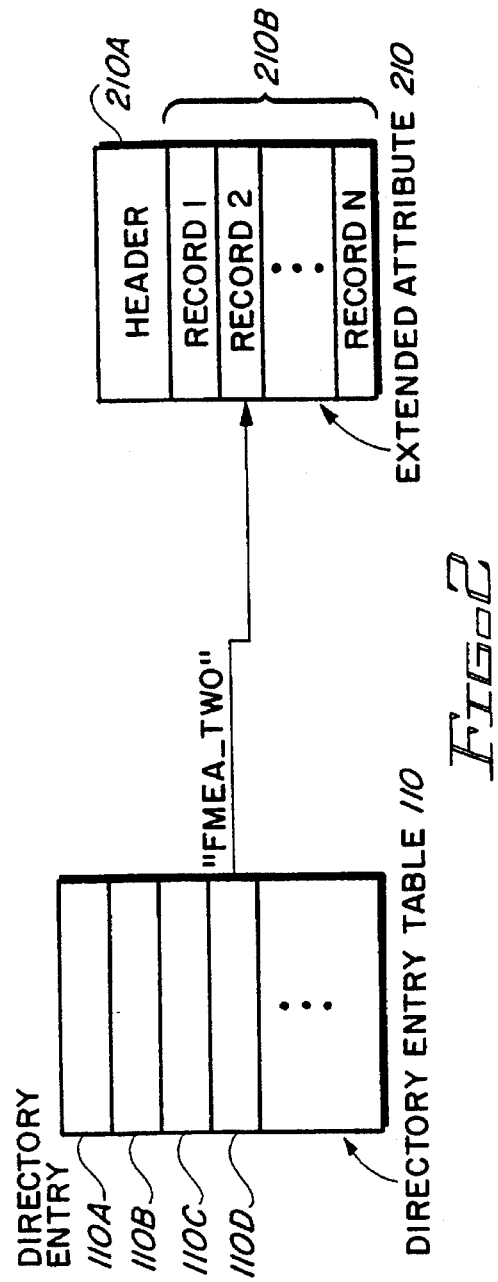

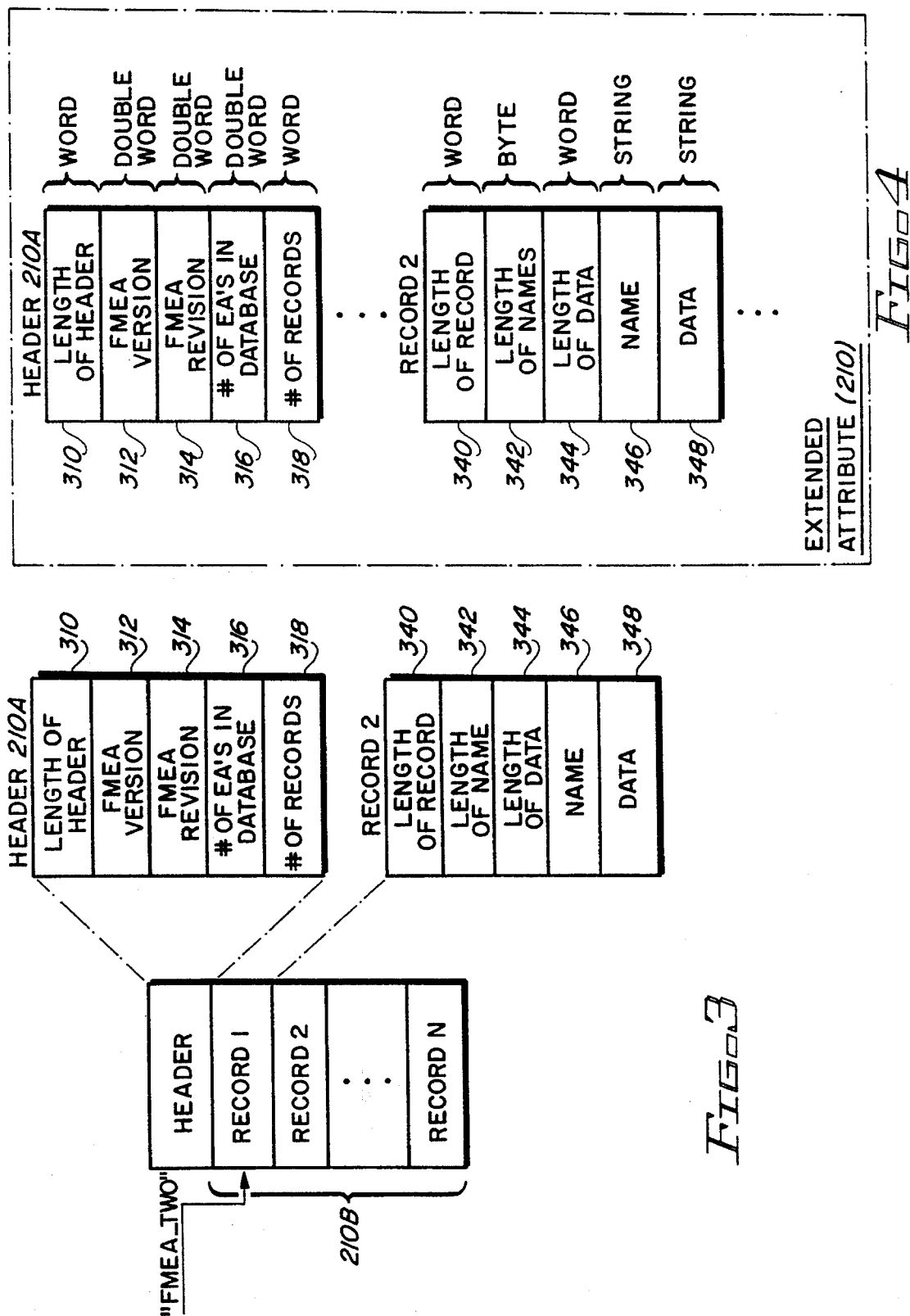

METHOD FOR STORING A DATABASE IN EXTENDED ATTRIBUTES OF A FILE SYSTEM

BACKGROUND OF THE INVENTION

1. Field of the Invention

The present invention is related to the field of file systems using extended attributes.

2. Background Art

In the prior art, several operating systems support the concept of extended attributes (EA). Usually, the extended attributes of the prior art are used for storing "attributes" or the contents of a database.

A prior art method, disclosed in U.S. Pat. No. 5,218,696 issued to Baird, et al. on Jun. 8, 1993, implements a method for dynamically expanding and rapidly accessing file directories in a UNIX tree-based file directory system. The technique provides name-oriented accessing of files having at least zero records, any access path to files and records through an external store coupling the computer being defined by a pair of related directories. An attribute directory of record entries is sorted on a two-part token. The token consists of a unique serial number assigned to the record and the unique serial number of any parent record entry. Each record entry includes the token, file or record name, and external store address or pointer. The name directory is a subset of the attribute directory. A traverse through the tokens constitutes a leaf-searchable B-tree. The names directory provides fast access into the attribute directory. Thus, Baird, et al., is directed to a method for dynamically expanding and rapidly accessing file directories. However, the prior art lacks an architecture of extended attributes for providing improved file system management, maintenance, and control by creating and storing a database inside the extended attributes.

Another prior art method, disclosed in U.S. Pat. No. 5,113,519 issued to Johnson, et al. on May 12, 1992, implements a system and method for maintaining file attributes at a server data processing system in a distributed data processing system. The file attributes include file size, modify time, and access time. The system and method provides a protocol that allows processes in the distributed environment to access a file. A file is accessed either through system calls or through a mechanism mapping the file to the address space of each process. Thus, the attributes of the files are distributed to all of the interested processes. The attributes are maintained separately and independently from each of the other attributes in the distributed environment. Johnson, et al., is directed to a system and method for maintaining file sizes, modify times, and access times at a server data processing system in a distributed data processing system. However, the prior art lacks an architecture of extended attributes for providing improved file system management, maintenance, and control by creating and storing a database inside the extended attributes.

While the prior art allows an extended attribute to be named and can store information, it fails to define an architecture for storing information in the extended attributes. Thus, the prior art does not provide high performance file management using extended attributes.

SUMMARY OF THE PRESENT INVENTION

The present invention provides a definition, format, and structure of extended attributes for managing, maintaining, and controlling file systems. This is accomplished by creating a database containing management, maintenance, control, and other user-defined data that are associated with a directory entry of the file system. The database is stored inside the extended attribute or sets of extended attributes.

According to the present invention, each extended attribute includes a header for defining the extended attribute that comprises a first plurality of fields. It also includes a plurality of records for storing data. In turn, each record of the plurality of records comprises a second plurality of fields. The extended attribute is identified by a string stored in a directory entry of a directory entry table for the file system. The string comprises a predetermined substring denoting the extended attribute having the database architecture of the present invention. The first plurality of fields of the extended attribute includes fields for storing a length of the header, a version number of the header, a revision number of the header, the number of extended attributes in the database, and the number of records in the plurality of records in the database. The second plurality of fields includes fields for storing a name of a record, data, a record length, a length of the record name, and a length of the data. Both the name and data are stored as strings.

BRIEF DESCRIPTION OF THE DRAWINGS

FIG. 1 is a diagram illustrating a file system comprising a directory entry table and extended attributes;

FIG. 2 is a diagram illustrating an extended attribute of the present invention including a header and a set of N records;

FIG. 3 is a diagram illustrating the internal format of an extended attribute of the present invention;

FIG. 4 is a diagram illustrating data types used for header fields and record fields of the extended attribute of FIG. 3; and, FIG. 5 is a flow diagram illustrating a method of searching for a directory entry (entries) that may contain an FMEA database.

DETAILED DESCRIPTION OF THE PRESENT INVENTION

Figure 5:
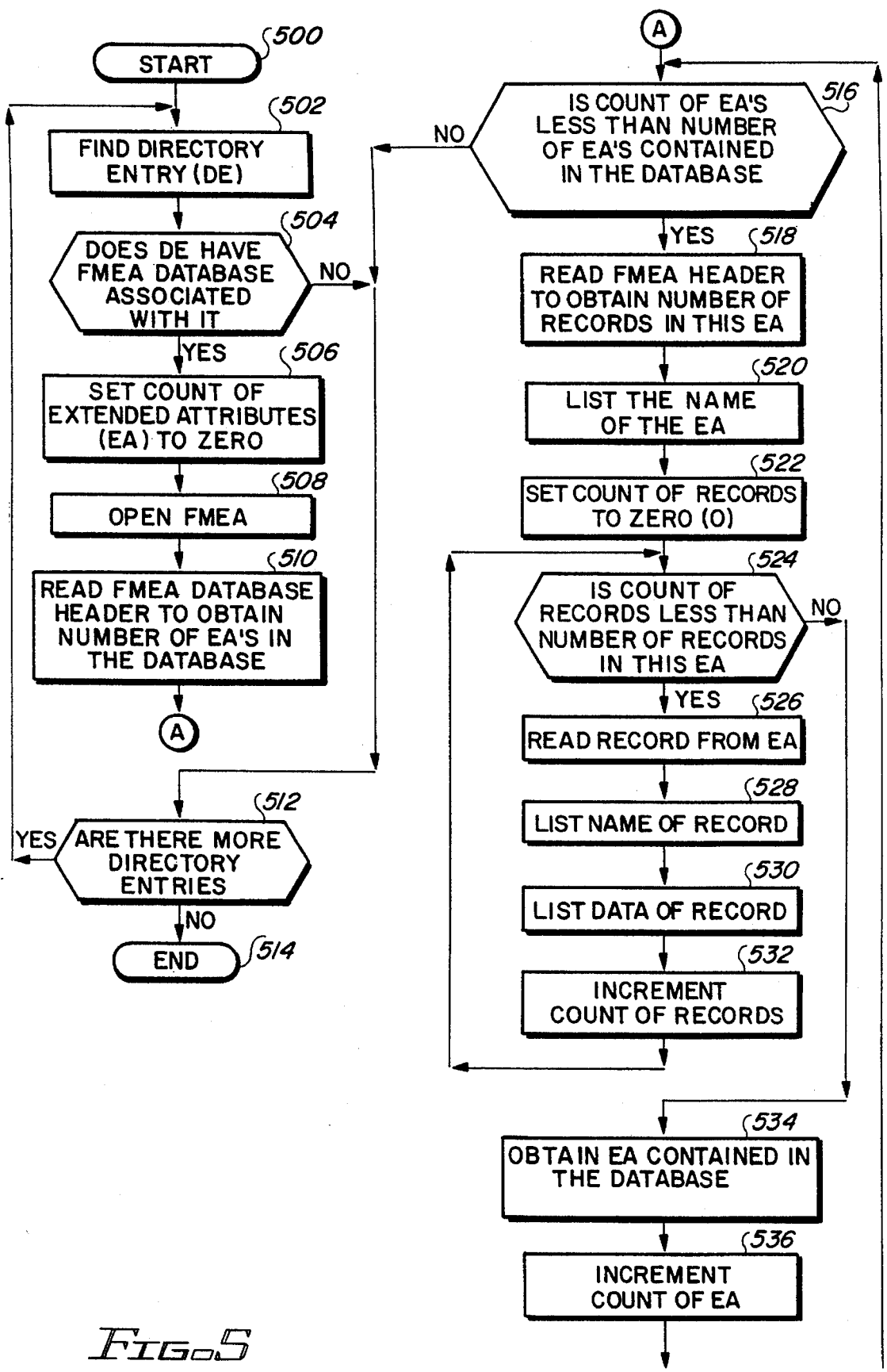

A method for providing file system management using extended attributes is described. In the following description, numerous specific details, such as file formats, pointers, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

File System Supporting Extended Attribute Architecture

The present invention is an architecture for managing file systems (e.g., Netware File Systems Version 3.X and greater) with support for extended attributes. FIG. 1 is a diagram illustrating a representation of a file system, i.e., Netware File System Version 3.X. The file system 104 comprises a directory entry table 110 and extended attributes 120, 130, and 140. The directory entry table 110 comprises directory entries 110A–110D. FIG. 1 illustrates that a single extended attribute 140 or lists of extended attributes 120 and 130 may be associated with each directory entry 110A–110D. A directory entry 110A–110D is defined to be a file or directory in the file system 110. The extended attributes of each directory entry 110A–110D are "hidden"

from users of the file system 104 and are not normally "visible" from any clients of the files system 104. Application software and operating systems (e.g., OS/2) use extended attributes (e.g., extended attributes 120 and 130) to store information about a file. This information includes proprietary and application dependent information.

The present invention more clearly specifies the definition, format, and structure of extended attributes 120 and 130 for the purposes of managing, maintaining, and controlling file systems 104. This is accomplished by creating a database containing management, maintenance, control, and other user-defined data that are associated with a directory entry 110A–110D. The database is stored inside the extended attributes 120 or sets of extended attributes 120 and 130.

In the following description, an extended attribute 120 and 130 that supports this architecture is referred to as a file management extended. attribute (FMEA). The file system 104 of the present invention allows extended attributes 120, 130, and 140 with text strings of known length. In the preferred embodiment of the present invention, the text strings may comprise up to 255 characters in length. Extended attributes 120 and 130 supporting the FMEA architecture are required to include the substring "FMEA" at the start of their name. The present invention is not limited to the substring "FMEA", and other character combinations may be utilized without departing from the scope of the present invention. The substring may be followed with any combination of characters allowed by the extended attribute naming conventions of the file system 104. Any extended attribute having the string "FMEA" beginning its name is considered to be part of the FMEA database for the particular directory entry. Other extended attributes may be associated With a directory entry 110A–110D, but are not supported by either tools or methods adhering to the FMEA architecture. For example, extended attribute 140 of directory entry 110A has a name beginning with the substring "XYZ123" and is not part of the FMEA database; however, extended attribute 120 of directory entry 110C is part of the FMEA database.

Database Using Extended Attribute Architecture

An FMEA database is structured as one or more FMEA's that is formatted as shown in FIG. 2. FIG. 2 is a diagram illustrating that an FMEA 210 includes a header 210A and a set 210B of N records (i.e., record 1 to record N). The FMEA 210 of directory entry 110D is referenced by a name "FMEA_TWO". Header 210A is followed by a set 210B of one or more records. For this architecture, an FMEA without records is deleted from the database, i.e., if FMEA 210 has no records, FMEA 210 is deleted from the database. FIG. 2 demonstrates the internal structure of the database.

Internal Architecture of Extended Attribute

FIG. 3 is a diagram illustrating the internal format of an FMEA. Extended attribute 210 is an FMEA as indicated by its name starting with substring "FMEA". The extended attribute 210 comprises header 210A and a set 210B of N records. The set 210B of N records includes record 2. Header 210A and record 2 are shown in detail (indicated by dashed lines).

The header 210A is a variable length structure that can be extended by adjusting the length field and attaching additional information at the end of the header structure. The header 210A comprises fields 310, 312, 314, 316, and 318. The length of the header 310 specifies the length of the header structure (i.e., in bytes) and is also used to determine the offset of a first record (i.e., record 1) in extended attribute 210. Fields 312 and 314 store the FMEA version and revision, respectively. Field 316 contains the number of FMEA's in the database. Each FMEA in the database stores this number in field 316 of its header. Field 316 of the FMEA 210 is used to determine the presence of all necessary FMEA's in the database. The number of records field 318 refers to the records within the specific FMEA 210, rather than to the total number of records in the FMEA database given by field 316.

The extended attribute 210 of FIG. 3 includes a set 210B of N records including record 2. Record 2 of FMEA 210 is shown in detail in FIG. 3 comprising fields 340, 342, 344, 346, and 348. The length of the record field 340 specifies the length of the record structure (i.e., in bytes). Field 342 contains the length of name specifying the number of characters, up to a predetermined number (e.g., 255 characters), in the name. Field 344 stores the length of data contained in the record (i.e., record 2). Field 346 contains the name of the particular record (i.e., record 2 in this instance). Field 348 of the FMEA 210 contains the data stored in record 2.

FIG. 4 is a detailed diagram illustrating specific data types used in the preferred embodiment of the present invention for fields 310–318 of a header 210A and fields 340–348 of a record for FMEA 210 of FIG. 3. In the preferred embodiment of the present invention, a byte is defined as an unsigned 8-bit integer, a word is an unsigned 16-bit integer, a double word is an unsigned 32-bit integer, and a string is a sequence of bytes.

The length of a header field 310 of header 210A is a word data type allowing the header 210A to be up to 65,535 bytes long. The FMEA version and revision fields 312 and 314 are each double words (i.e., 32-bit integers). The number of FMEA's in the database field 316 is a double word allowing the database to contain up to four gigabytes (4 GB) of extended attributes. The number of records field 318 is a word allowing the extended attribute (i.e., the specific FMEA 210) to contain up to 65,535 records.

The length of record field 340 of record 2 is a word data type allowing the record to be up to 65,535 bytes long. The length of name field 342 is a byte allowing a record name 346 (string) to contain up to 255 characters. The length of data field 344 is a word permitting the data 348 (string) to contain up to 65,535 characters. As stated previously, the name field 346 and data field 348 are sequences of bytes (up to 255 and 65,535 bytes, respectively).

Database Operations Using Extended Attribute Architecture

The architecture of extended attributes (FMEA), as illustrated in FIGS. 1–4, may be used by tools and methods for providing access to directory entries (i.e., directory entries 110A–110D of directory entry table 110 of FIG. 1) using the record names 346 as search keys. For example, an application program may allow the file system to "tag" a directory entry 110A–110D of FIG. 1 with application types: "word processing", "spreadsheet", etc. Thus, an entire file system 104 may be searched for all files and directories (i.e., directory entries 110A–110D of a directory entry table 110) having the type "word processing". The string "word processing" is stored in the name field 346 of a record (e.g., record 2 of set 210B shown in FIGS. 2–4) in the FMEA database for the files and directories of the file system 104. This facility would allow an administrator of the file system 104 to determine storage space used by textual files in contrast to executable files, for instance. While a specific example is illustrated for finding files and directories having the type "word processing", it should be apparent to a person skilled in the art that the present invention may be used by tools and methods to accomplish the management, maintenance, and control of files and directories in a file system (e.g., the Novell Netware environment).

The present invention for providing an extended attributes architecture may be used to allow file system administrators to easily manage files and directories in a computer networking environment (e.g., the Novell Netware environment). Table 1 contains several applications of the present invention that may use Novell Netware utilities.

TABLE 1

| NCOPY: | Copy all files matching an FMEA record name. |
|---|---|
| NDIR: | Display directory information of a file matching the FMEA record name. |
| SMS: | Backup a directory entry (entries) matching the FMEA record name. |
| FILER: | Allow the creation and administration of FMEA databases and their contents. |
| FLAG: | Add record names to an FMEA database (i.e., "tag" files and/or directories with a string). |

The NCOPY utility allows all files matching an FMEA name 346 to be copied. The NDIR utility displays directory information of a file in the file system 104 that matches the FMEA record name (e.g., "word processing"). The SMS utility makes backup copies of directory entries 110A–110D that match an FMEA record name 346. The FILER utility allows the creation and administration of FMEA databases and their contents. The FLAG utility adds record names to an FMEA database. This is done by "tagging" files or directories (directory entries 110A–110D) with a string.

The present invention may be used to implement a version control system for files. Using the extended attribute architecture, the version control system is able to keep track of file information: version number of the file, the date that the file was built, the owner (or person responsible for) of the file, and an electronic footprint of the file for detecting when non-FMEA applications modify the file. Prior art version control systems are inefficient, particularly regarding the release of software files. With the FMEA architecture and file system utilities, a source code librarian may "tag" files as release files using the string "release" in the record names 346. The utility NCOPY may be used to copy all "release" files to a compact disc (CD) for storage, for example. In the prior art, this operation is done manually by copying the "release" files manually, which is slow and inefficient. Thus, the present invention provides an efficient method for copying "release" files.

The extended attribute (FMEA) architecture of the present invention allows multiple FMEA databases to be associated with a file(s). Application programs may create sets of FMEA's for use by the application programs as long as the application programs adhere to the architecture of the present invention so that file system utilities and other FMEA applications (and methods) may support them.

Searching For Directory Entries Using The Present Invention

FIG. 5 is a flow diagram illustrating a method of searching for a directory entry (entries) that may contain an FMEA database associated with it. It further illustrates a method of reading each record in the FMEA database and outputting the names and data of the records to the user. FIG. 5 is provided by way of example to illustrate data flow using the definition, format, and structure of extended attributes for managing, maintaining, and controlling file systems according to the present invention. Execution begins at step 500. In step 502, a directory entry (DE) is found (e.g., DE 110A–110D). In decision block 504, a check is made to determine if the directory entry has an FMEA database associated with it. In the preferred embodiment of the present invention, this check is accomplished by looking at the starting substring of the name of the extended attribute to determine if it contains "FMEA". If the name of the extended attribute begins with "FMEA", the extended attribute is assumed to contain an FMEA database. Thus, when decision block 504 returns false (no), execution continues at decision block 512. In decision block 512, a check is made to determine if there are more directory entries in the file system (e.g., file system 104). When decision block 512 returns false (no), execution continues at step 514. In step 514, execution terminates. When decision block 512 returns true (yes), execution continues at step 502. When decision block 504 returns true (yes), execution continues at step 506.

In step 506, a count of extended attributes is set to zero. In step 508, an FMEA of the directory entry is opened (e.g., extended attribute 120 of DE 110C in FIG. 1). In step 510, the FMEA database header is read to obtain the number of extended attributes in the database (e.g., field 316 of header 210A shown in FIG. 4). In step 516, a check is made to determine if the count of extended attributes is less than the number of extended attributes in the FMEA database. When decision block 516 returns false (no), execution continues at decision block 512 (described above). When decision block 516 returns true (yes), execution continues at step 518.

In step 518, the FMEA header is read to obtain the number of records in the particular extended attribute (i.e., field 318 of header 210A shown in FIGS. 3 and 4). In step 520, the name of the extended attribute is output to the user. In step 522, a count of records is set to zero. In decision block 524, a check is made to determine if the count of records is less than the number of records in the extended attribute. When decision block 524 returns false (no), execution continues at step 534. In step 534, another extended attribute (FMEA) containing the FMEA database is obtained. In step 536, the count of extended attributes is incremented. Execution continues at decision block 516. When decision block 524 returns true (yes), execution continues at step 526.

In step 526, a record of the extended attribute (e.g., record 2 of extended attribute 210 shown in FIG. 3) is read. In step 528, the name of the record (i.e., field 346 shown in FIGS. 3 and 4) is output. In step 530, the data of the record (i.e., field 348 shown in FIGS. 3 and 4) is output to the user. It should be apparent to a person skilled in the art that the name 346 and/or data 348 of the record may require interpretation or other processing. In step 532, the count of records is incremented. Execution continues at decision block 524.

In this manner, a method for providing a definition, format, and structure of extended attributes for managing, maintaining, and controlling file systems is disclosed.

I claim:

1. A method for storing a database in extended attributes of a directory entry within a file system comprising the steps of:

associating a plurality of extended attributes with a directory entry of a file system, each of said plurality of extended attributes comprising a first field indicating the number of said plurality of extended attributes associated with said directory entry; and storing an arbitrary number of records of arbitrary content in each of said plurality of extended attributes associated with said directory entry.

2. The method of claim 1 wherein said step of associating a plurality of extended attributes with a directory entry includes the step of employing a predefined text string within each of said plurality of extended attributes.

3. The method of claim 1 wherein said directory entry with which said plurality of extended attributes are associated comprise a database identifier indicating that said extended attributes are compliant with a predetermined architecture.

4. The method of claim 3 wherein said directory entry with which said plurality of extended attributes are associated comprise a name of said plurality of extended attributes.

5. The method of claim 1 wherein, for each of said plurality of extended attributes, said extended attribute comprises a second field indicating the number of records stored in said extended attribute.

6. A method for navigating a database contained in extended attributes of a file system having a plurality of directory entries, comprising the steps of:

reading a first directory entry within a file system;

determining whether said first directory entry has associated with it an extended attribute;

if said first directory entry has an extended attribute associated with it; (a) examining a first field of said extended attribute indicating the number of extended attributes associated with said first directory entry, (b) reading from a second field of said extended attribute the number of records stored in said extended attribute, examining a record of said extended attribute, incrementing a first counter of examined records of said extended attribute, comparing the value of said counter of examined records to said number of records stored in said extended attribute, and (c) repeating said steps of examining a record, incrementing a counter, and comparing the value of said counter of examined records to said number of records if the value of said counter of examined records is less than said value of records stored in said extended attribute; and repeating the above steps for the remaining of said plurality of directory entries.

7. The method of claim 6 wherein said directory entries comprise entries for files and entries for subdirectories.

8. The method of claim 6 wherein said step of examining a record stored in an extended attribute comprises examining data of said record, and further comprising the steps of:

comparing said data of said record to record selection criteria specified by a user;

supplying data of said record to a user if said data of said record meets said criteria.

9. The method of claim 6 wherein:

said step of examining said first field of said extended attribute for said first directory entry comprises incrementing a second counter of extended attributes examined for said first directory entry;

said method further comprising the steps of:

comparing a value of said second counter of extended attributes examined to said number of extended attributes;

refraining from reading any additional extended attributes associated with said first directory entry if said value of said second counter of extended attributes examined equals said number of extended attributes.

10. The method of claim 6 wherein said step of examining a first field of said extended attribute comprises the step of examining a header of said extended attribute.

11. The method of claim 6 wherein said step of examining an extended attribute comprises the step of examining a header of said extended attribute, said header comprising data specifying a length of said header.

12. The method of claim 11 wherein said header comprises said first field and said second field.

13. The method of claim 12 wherein each of said records in said extended attribute comprises data specifying a length of said record.

14. The method of claim 13 wherein a beginning of a first record of said extended attribute is determined from said data specifying said length of said header and wherein a beginning of any subsequent record of said extended attribute is determined from said data specifying said length of said first record.

* * * * *

UNITED STATES PATENT AND TRADEMARK OFFICE
CERTIFICATE OF CORRECTION

PATENT NO. : 5,499,358
DATED : March 12, 1996
INVENTOR(S) : Bruce A. Tate and Shih-Gong Li It is certified that error appears in the above-identified patent and that said Letters Patent is hereby corrected as shown below:

Col. 2, lines 6-7, delete "Invention" and insert
--invention--;
Col. 5, line 1, after "numberline" delete "." and insert
--,--;
lines 43-44, delete "Implement" and insert
--implement--;
line 44, delete "ape" and insert --are--;
Col. 7, line 55, delete "specify" and insert --Specify-- and
Col. 8, line 16, delete "use" and insert --user--.

Signed and Sealed this

Twenty-third Day of July, 1996

Attest:

BRUCE LEHMAN

*Attesting Officer*     *Commissioner of Patents and Trademarks*